(12) United States Patent
Yang et al.

(10) Patent No.: US 10,428,871 B2
(45) Date of Patent: Oct. 1, 2019

(54) BEARING RING

(71) Applicant: Aktiebolaget SKF, Gothenburg (SE)

(72) Inventors: Hongyu Yang, Houten (NL); Defeng Lang, Delft (NL); Jozef Maria Storken, Nieuwegein (NL)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/533,571

(22) PCT Filed: Dec. 19, 2014

(86) PCT No.: PCT/EP2014/078664
§ 371 (c)(1),
(2) Date: Jun. 6, 2017

(87) PCT Pub. No.: WO2016/096031
PCT Pub. Date: Jun. 23, 2016

(65) Prior Publication Data
US 2017/0321746 A1   Nov. 9, 2017

(51) Int. Cl.
*F16C 19/52* (2006.01)
*F16C 33/58* (2006.01)
*F16C 19/06* (2006.01)

(52) U.S. Cl.
CPC .......... *F16C 19/522* (2013.01); *F16C 33/586* (2013.01); *F16C 19/06* (2013.01)

(58) Field of Classification Search
CPC ..... F16C 19/522; F16C 19/525; F16C 19/527
USPC .......................................................... 384/448
See application file for complete search history.

(56) References Cited

U.S. PATENT DOCUMENTS

| 9,546,689 B2* | 1/2017 | Yang ..................... F16C 33/586 |
| 9,546,690 B2* | 1/2017 | Herdier ................. F16C 19/522 |
| 9,746,387 B2* | 8/2017 | Yang ........................ F16C 19/52 |
| 9,897,514 B2* | 2/2018 | Yang ..................... F16C 33/586 |
| 2012/0229004 A1 | 9/2012 | Takahashi et al. |
| 2013/0188897 A1 | 7/2013 | Reedman et al. |

FOREIGN PATENT DOCUMENTS

| DE | 102009005888 A1 | 7/2010 |
| EP | 2184182 A1 | 5/2010 |
| WO | 2013186256 A1 | 12/2013 |
| WO | 2014090324 A1 | 6/2014 |
| WO | 2014108170 A1 | 7/2014 |

* cited by examiner

*Primary Examiner* — James Pilkington
(74) *Attorney, Agent, or Firm* — Bryan Peckjian; SKF USA Inc. Patent Dept.

(57) ABSTRACT

A bearing ring having an elongated sensor element that runs along at least a part of a surface of the bearing ring. The connection between the sensor element and the bearing ring is established by a metallic metal material connected by material bonding with the bearing ring as well as with the sensor element. To improve the life of the bearing a sensor element is arranged in a groove that is machined in the bearing ring. The groove extends from the surface of the bearing ring. The metallic material includes or is connected with a flat metallic strip. The flat metallic strip is arranged at or in the surface of the bearing ring and covers the groove.

16 Claims, 2 Drawing Sheets

BEARING RING

CROSS REFERENCE

This is a United States National Stage Application claiming the benefit of International Application Number PCT/EP2014/078664 filed on Dec. 19, 2014, of which is incorporated herein by reference in its entirety.

FIELD OF THE INVENTION

The invention relates to a bearing ring having an elongated sensor element that runs along at least a part of a surface of the bearing ring. More particularly, the invention relates to a connection between the sensor element and the bearing ring that is established by a metallic material.

BACKGROUND OF THE INVENTION

It is known to equip a bearing ring with a glass fiber element to allow the measurement of different physical parameters. By doing so, a survey of the parameters becomes possible by using the fiber Bragg grating (FBG) method. By this method temperatures as well as strains of the machine arrangement can be monitored.

For doing so it is necessary to connect a glass fiber with the component. For surveying temperatures it is essential that a thermal coupling between the glass fiber and the machine arrangement is established. For monitoring strains it is necessary to mechanically connect firmly the glass fiber with the component to be monitored.

Specifically in the latter case problems arise because the glass fiber is normally equipped with a plurality of coaxially arranged cover layers. A typical construction employs a cladding arranged around the glass fiber (core) itself; the cladding is coated by a coating layer. Then, strengthening fibers (made e.g. from aramid) are arranged at the outer circumference of the coating. Finally the strengthening fibers are cased by a hollow cylindrical cable jacket.

When a glass fiber element of this type is connected with the component, a certain elasticity is immanent between the glass core and the component. Thus, specifically the measurement of strains is problematic due to the elasticity. This is specifically a problem when the component is not even or flat but if it has a spherical shape. This is typical in the case of a bearing ring, specifically of a roller bearing.

Another problem is arising when the bearing ring has only small dimensions. In this case machining grooves for embedding of the glass fiber in the bearing ring often takes away much steel and thus affects a significant reduction in the bearing stiffness and strength. Small bearing rings with respective grooves may damage easily and therefore sustain short service life.

Also, a high temperature bonding of glass fibers for carrying out the fiber Bragg grating method is always challenging. Traditional polymer glue does not meet with the requirements which have to be demanded for proper measurement of temperatures.

Finally, the installation and sustainability of bearings for installation and after installation is also often a problem.

There have been no pre-known designs which solve the mentioned problems. Connections methods have been known for small bearings but the connection of the glass fiber to the bearing ring protects only from oil and grease rather than provide a robust integration and high temperature applications.

BRIEF SUMMARY OF THE INVENTION

It is an object of the present invention to propose a bearing ring of the kind mentioned above which is designed in such a manner that a contact is established between the glass fiber core and the component which has a sufficient stiffness, but which influences the mechanical strength of the bearing ring only minimal. Thus, a proper measurement of stresses should become possible, while the mechanical stiffness of the bearing ring is not reduced significantly. So, a high life time of the bearing ring should be maintained.

A solution according to the invention is characterized in that the sensor element is arranged in a groove which is machined in the bearing ring, which groove extends from the surface of the bearing ring, wherein the metallic material comprises or is connected with a flat metallic strip and wherein the flat metallic strip is arranged at or in the surface of the bearing ring and covers the groove.

Preferably, the sensor element is arranged at or in an outer cylindrical surface of the bearing ring.

Preferably, the sensor element is a glass fiber or comprises a glass fiber.

The metallic material for connecting the sensor element with the bearing ring and the flat metallic strip are preferably made as one piece. The metallic material can be arranged circular around the sensor element. It can encase the sensor element and can consist of at least two different layers. An outer layer can consist of steel, especially of stainless steel. An inner layer can consist of nickel.

The metallic material can be fixed in the groove by means of a bonding material, such as an adhesive. In this case the bonding material or adhesive can be a ceramic glue or a high temperature glue.

The metallic material can also be fixed in the groove by means of a bonding material, such as a brazing material, especially by means of a vacuum brazing material.

Still another possibility has been proven as being an advantageous embodiment of the present invention for assembly of the arrangement: The groove for containing the sensor element may be well machined dimensionally tight for the reception of the sensor. Before integrating the sensor case into the groove, the bearing can be warmed up first to expand the groove dimension; meanwhile, the sensor case may be either in room temperature or even cooled down (be frozen) to shrink in dimension. By doing this, an easy assembly may be achieved by inserting the sensor case into the bearing groove. When the assembled bearing returns to room temperature or raise to same high temperature the assembly may be tightly fixed together. Since the dimensionally tight fit utilizes heat to expand the bearing to expand the groove dimension to receive the sensor and/or the dimensionally tight fit utilizes cooling to shrink the sensor case, this describes a dimensional condition where the sensor and the groove dimension can be an interference fit. An interference fit is one where dimensions of the engaging surface of the inserted component are greater than the dimensions of the engaging surface of the receiving component.

The flat metallic strip can have a surface which flushed with the surface of the bearing ring; this applies also in the case that the flat metallic strip is additionally covered by a foil (i.e. made of stainless steel).

The flat metallic strip can alternatively project from the surface of the bearing ring by a predetermined height.

The flat metallic strip can be connected with the bearing ring by material bonding. In this case a specifically preferred embodiment suggests that the flat metallic strip is connected with the bearing ring by welding, especially by spot welding.

According to the invention the sensor, especially an optical sensor/glass fiber sensor (FBG sensor) is indirectly embedded into the bearing ring.

The invention provides an efficient solution for small size bearings or high temperature applications and guarantees a robustness of the fixation of the glass fiber sensors during the bearing installation process.

Beneficially, harsh environmental bearing applications such as subsea, windmill, high temperature steel production, etc. are not problematic due to the proposed design concept.

It is also an advantage that already a miniature groove on the bearing ring is sufficient to arrange the sensor; the groove is machined into the bearing ring for the installation of the sensor.

In the case of measurement of temperatures the sensor may be glued in the groove by using special glue (such as ceramic glue or high temperature glue) or using brazing joining technology (such as vacuum brazing). Thus, the sensor is material bonded in the groove.

The sensor arrangement has a reverse/upside down design like an omega (Ω) due to the metallic strip (see below FIG. 2). The metallic strip is preferably formed as a stainless steel shim; this design allows a perfect match/fit with the miniature groove in the outer surface of the bearing ring.

In the case of measuring stains by means of the fiber sensor it is beneficially that the sensor is embedded inside and uniformly centralized in the Omega structure of the sensor element (see also below FIG. 2).

It is also possible to cover the plane metallic strip with a slice of foil (preferably also made of stainless steel) so that the sensor structure is covered and protected.

The two lateral areas of the metallic strip (the "feet" of the "Omega") can be spot welded (or fixed by alternative welding techniques) on the two lateral sides of the miniature groove.

The bare fiber outside of the sensor area may be covered by epoxy packaging material or alternative by high temperature material such as ceramic ropes to protect the fiber.

The described bearing ring with the integrated sensor structure may be fitted into housing tightly. A small clearance (sometime negative clearance, i.e. press fit) may be used to secure the sensor fiber bonding and also as an efficient structure for sustainability after installation.

An important advantage of the proposed structure is that a significant contribution is given by the concept according to the invention with respect to the lifetime of the bearing and its strength. This is specifically, but not exclusively, important in the case of small size bearings. The integration of the sensor leads to less damages/influences to the bearing structure and life sustainability.

Another advantage is the contribution to strain transmission from the strain in the bearing ring to the optical fiber sensor.

BRIEF DESCRIPTION OF THE SEVERAL VIEWS OF THE DRAWING

The drawings show an embodiment of the invention.

DETAILED DESCRIPTION OF THE INVENTION

Figure 1:
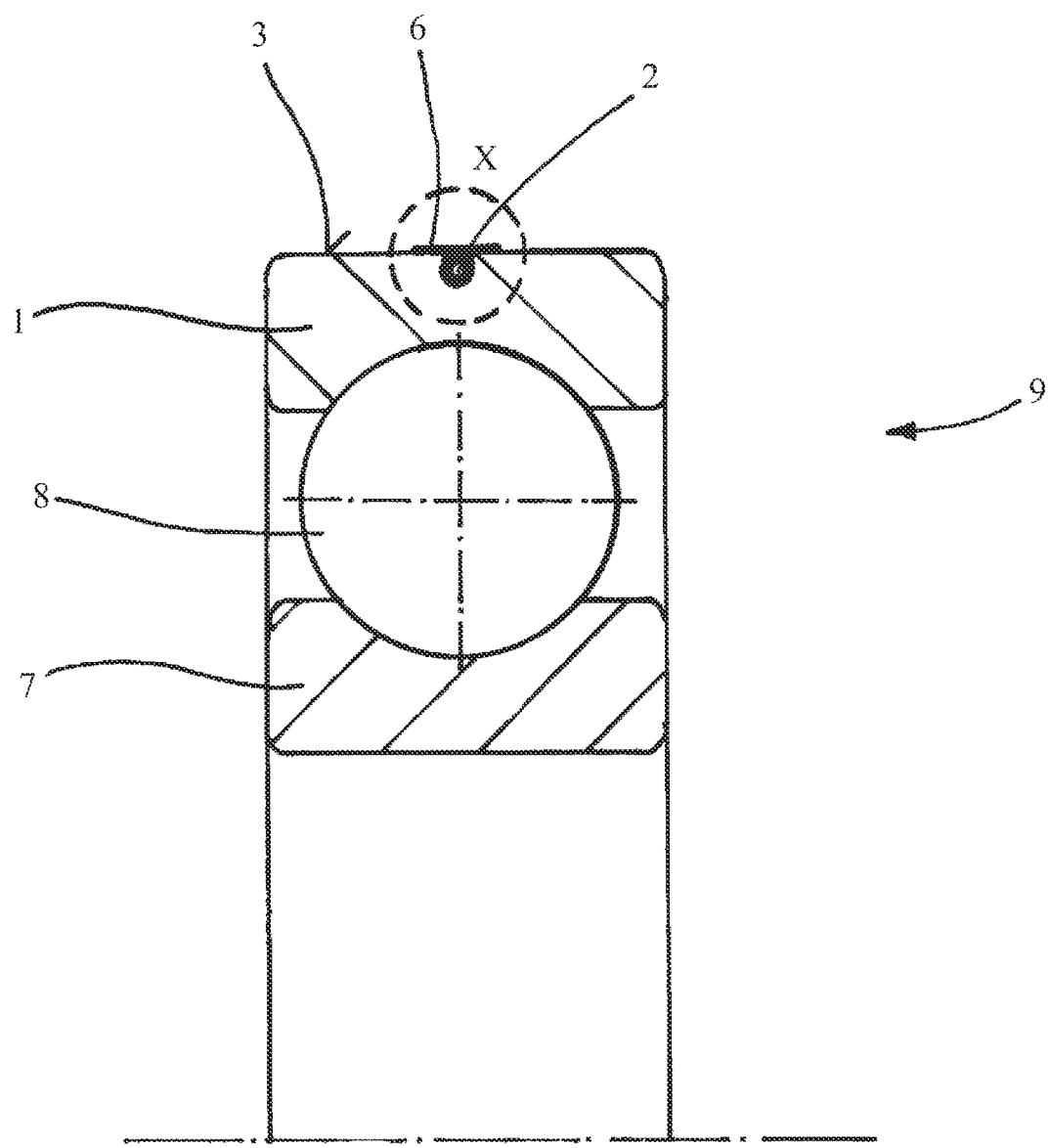
FIG. 1 presents a radial cross sectional view through a roller bearing.

In the figures a roller bearing 9 being a deep groove ball bearing in the present embodiment (of course other kinds of bearings are also possible) is depicted which has an outer bearing ring 1, an inner bearing ring 7 and roller elements 8 which are arranged between the bearing rings 1 and 7.

In the outer bearing ring 1 and more specifically in its radial outer surface 3 a sensor element 2 is mounted. The sensor element 2 is a glass fiber and allows the measurement of strains in the bearing ring 1. The survey of those strains is carried out by the Fiber Bragg Grating (FBG) method or by the Chemical Composition Grating (CCG) method which are known as such. Reference is made e.g. to U.S. Pat. No. 6,923,048 B2 where this technology is explained in more detail.

For the fixation of the glass fiber 2 in or at the bearing ring 1 a small groove 5 is machined into the outer surface 3 of the bearing ring 1 which runs around the whole circumference of the bearing ring 1. The sensor element 2 together with its encasing (see FIG. 2) is then laid into the groove and is fixed in the same by use of a bonding material, such as an adhesive or brazing material. The adhesive or brazing material is denoted with reference numeral 12 in FIG. 2.

Figure 2:
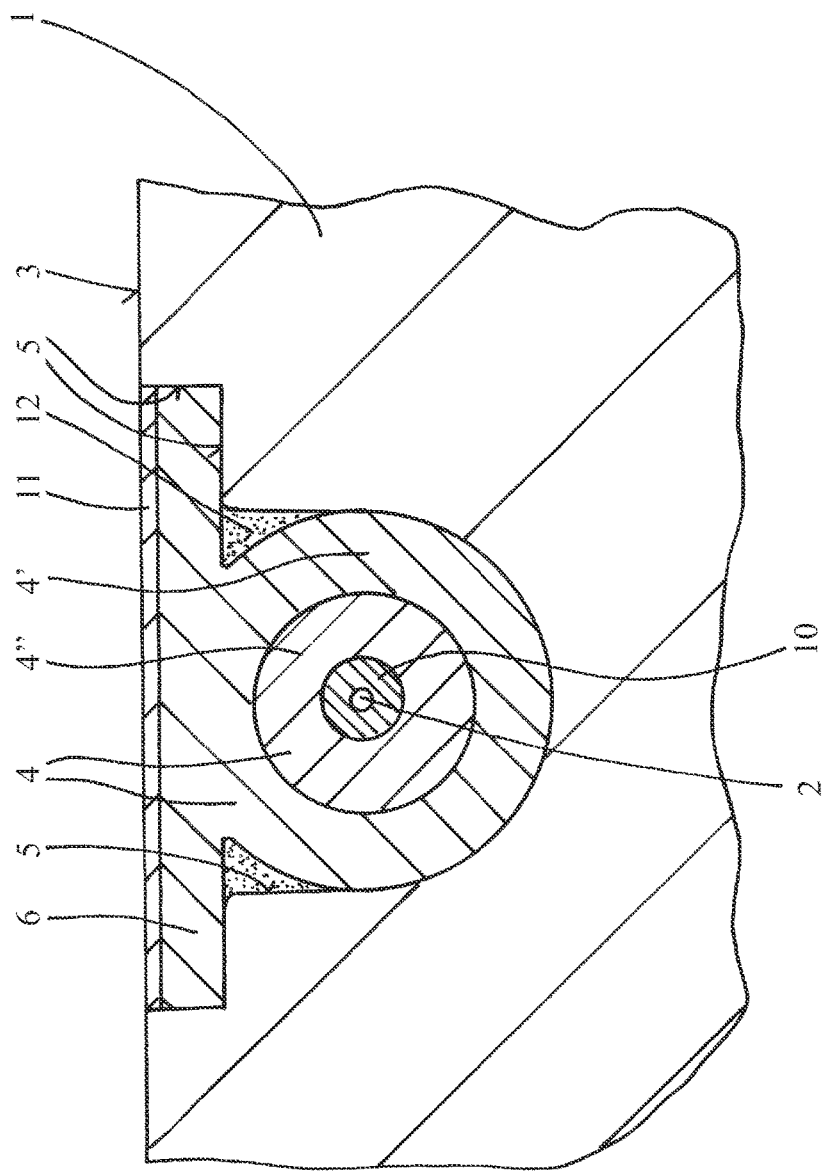
FIG. 2 presents an enlarged view of the region "X" according to FIG. 1.

The sensor element 2 with its encasing is shown in detail in FIG. 2. The optical glass fiber 2 as such is encased at first by a fiber cladding 10. Then, the cladding 10 is encased by a metallic material 4. This metallic material 4 consist of two different layers of metal. The first outer layer 4' is made of steel; the second inner layer 4" is encased by the first layer 4' and is made of nickel.

As an important aspect, the material of the first layer 4' is designed to form a metallic strip 6. As can be seen in FIG. 2 the whole sensor arrangement fits to the groove 5, including the metallic strip 6. The metallic strip 6, itself, is covered by a steel foil 11 in the depicted embodiment.

In the shown embodiment a flushing surface is given, i.e. the top side of the metallic strip 6 and more specifically of the steel foil 11 flushed with the surface 3 of the bearing ring 1.

Thus, the sensor element 2 is firmly fixed in the groove of the bearing ring 1 and can be mounted in a regular manner e.g. in a housing. If this is done with a press fit the fixation of the sensor arrangement is further improved.

REFERENCE NUMERALS

1 Bearing ring (outer bearing ring)
2 Sensor element (glass fiber; fiber core)
3 Surface of the bearing ring
4 Metallic material
4' First layer of metallic material
4" Second layer of metallic material
5 Groove
6 Metallic strip
7 Bearing ring (inner bearing ring)
8 Roller elements
9 Roller bearing
10 Fiber cladding
11 Steel foil
12 Adhesive/brazing

The invention claimed is:
1. A bearing ring, comprising:
an elongated sensor element that runs along at least a part of a surface of the bearing ring, wherein the connection between the sensor element and the bearing ring is established by a metallic metal material, the metallic metal material encapsulating the sensor element, wherein the metallic metal material is connected to the bearing ring by a bonding material, wherein the sensor element is arranged in an annular groove that is machined in the bearing ring, the groove extends from the surface of the bearing ring, wherein the metallic metal material is connected with a flat metallic strip, the flat metallic strip having a width in an axial direction that is greater than a width of the metallic metal material in the axial direction, wherein the flat metallic strip is arranged in accordance with one of (a) at the surface of the bearing ring or (b) in the surface of the bearing ring and covers the portion of the annular groove that receives the sensor element.

2. The bearing ring according to claim 1, the annular groove further comprising a flat metallic strip receiving groove portion having a size and shape to receive the flat metallic strip, wherein the flat metallic strip is arranged-in the flat metallic strip receiving groove portion, where the flat metallic strip is one of flush with an outer cylindrical surface of the bearing ring or beneath the outer cylindrical surface of the bearing ring.

3. The bearing ring according to claim 1, wherein the sensor element is a glass fiber or comprises a glass fiber.

4. The bearing ring according to claim 1, wherein the metallic metal material for connecting the sensor element with the bearing ring and the flat metallic strip are made as one piece.

5. The bearing ring according to claim 1, wherein the metallic metal material circumscribes the sensor element, the metallic material having a substantially circular cross section shape.

6. A bearing ring according to claim 1, wherein the metallic metal material that encapsulates the sensor element consists of at least two different layers.

7. A bearing ring according to claim 6, the flat metallic strip further comprises a stainless steel foil, wherein a surface of the stainless steel foil is flush with the surface of the bearing.

8. A bearing ring according to claim 6, further comprises an inner layer that consists of nickel.

9. A bearing ring according to claim 1, wherein the bonding material used to fix the metallic metal in the annular groove is an adhesive.

10. A bearing ring according to claim 9, wherein the adhesive is one of a ceramic glue or a high temperature glue.

11. A bearing ring according to claim 1, wherein the bonding material used to fix the metallic metal in the annular groove is a vacuum brazing material.

12. A bearing ring according to claim 1, the annular groove further comprising a flat metallic strip receiving groove portion having a size and shape to receive the flat metallic strip, wherein the flat metallic strip has a surface that is flush with the surface of the bearing ring.

13. A bearing ring according to claim 1, wherein the flat metallic strip projects from the surface of the bearing ring by a predetermined height.

14. A bearing ring according to claim 1, wherein the flat metallic strip is connected with the bearing ring by material bonding.

15. A bearing ring according to claim 1, wherein the flat metallic strip is connected with the bearing ring by spot welding.

16. A bearing ring, comprising:
an elongated sensor element that runs along at least a part of a surface of the bearing ring, wherein the connection between the sensor element and the bearing ring is established by a metallic metal material that is connected by material bonding with the bearing ring as well as with the sensor element,
wherein the sensor element is arranged in a groove that is machined in the bearing ring, the groove extends from the surface of the bearing ring, wherein the metallic metal material is connected with a flat metallic strip, and wherein the flat metallic strip is arranged at or in the surface of the bearing ring and covers the groove,
wherein the flat metallic strip projects from the surface of the bearing ring by a predetermined height.

* * * * *